United States Patent

Ueda et al.

[11] 4,107,706
[45] * Aug. 15, 1978

[54] CAMERA APPARATUS

[75] Inventors: Hiroshi Ueda, Nara; Kayoshi Tsujimoto, Osaka, both of Japan

[73] Assignee: Minolta Camera Kabushiki Kaisha, Osaka, Japan

[*] Notice: The portion of the term of this patent subsequent to Apr. 15, 1993, has been disclaimed.

[21] Appl. No.: 425,350

[22] Filed: Dec. 17, 1973

Related U.S. Application Data

[63] Continuation-in-part of Ser. No. 209,044, Dec. 17, 1971, Pat. No. 3,779,141.

[30] Foreign Application Priority Data

| Dec. 19, 1970 [JP] | Japan | 45-113589 |
| Feb. 6, 1971 [JP] | Japan | 46-4917 |
| Aug. 4, 1971 [JP] | Japan | 46-58251 |

[51] Int. Cl.$^2$ .................. G03B 7/08; G03B 15/05; G03B 11/00
[52] U.S. Cl. ............................. 354/31; 354/33; 354/34; 354/35; 354/59; 354/145; 354/286; 362/4
[58] Field of Search ............ 354/31, 32, 33, 34, 354/35, 59, 60, 126, 135, 145, 152, 286, 288

[56] References Cited

U.S. PATENT DOCUMENTS

| 3,180,218 | 4/1965 | Durst | 354/59 X |
| 3,212,419 | 10/1965 | Fischer | 354/59 |
| 3,286,609 | 11/1966 | Kobayashi et al. | 354/59 |
| 3,463,065 | 8/1969 | Kobayashi | 352/141 |
| 3,714,872 | 2/1973 | Mashimo et al. | 354/33 |
| 3,726,197 | 4/1973 | Hasegawa | 354/33 X |
| 3,779,141 | 12/1973 | Ueda et al. | 354/33 |

FOREIGN PATENT DOCUMENTS 940,262  3/1956  Fed. Rep. of Germany ............ 354/31

Primary Examiner—L. T. Hix
Assistant Examiner—William B. Perkey
Attorney, Agent, or Firm—Watson, Cole, Grindle & Watson

[57] ABSTRACT

An exchangeable lens barrel for use in a photographic camera is provided with a light sensitive element which, when the exchangeable lens barrel has been exactly fitted to the camera, receives the light which is reflected from the light sensitive film surface after it is transmitted through the objective lens and the iris aperture of the exchangeable lens barrel. A control system for an electronic flash tube in the camera or an electronic flash device fitted to the camera comprises a lighting control circuit and includes a timing circuit which controls the lighting of the electronic flash tube. The timing circuit is connected with the light sensitive element to generate a current which is integrated by the timing circuit, and the electronic flash tube is extinguished when the integrated voltage reaches a certain predetermined level, thereby the opening of the iris aperture in the exchangeable lens barrel in transmitted to the control circuit.

23 Claims, 13 Drawing Figures

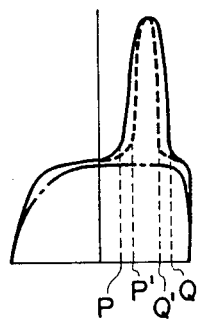
FIG. 6
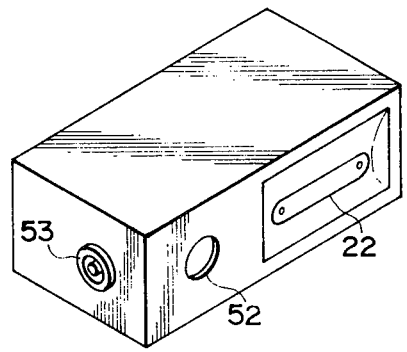
FIG. 7
FIG. 8(A)
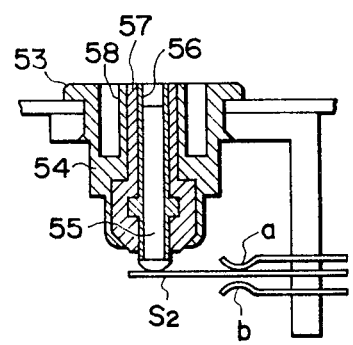
FIG. 8(B)
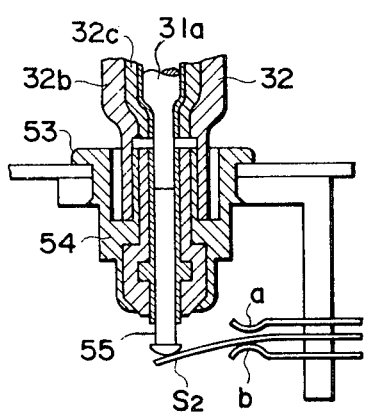

CAMERA APPARATUS

This is a continuation-in-part of application Ser. No. 209,044, filed Dec. 17, 1971 now U.S. Pat. No. 3,779,141.

BACKGROUND OF THE INVENTION

The present invention relates to apparatus for controlling an electronic flash, and more particularly, to camera apparatus having an exchangeable lens barrel which is provided with a light receptive element for receiving, when the barrel is mounted on the photographic camera body, the reflected imaging light rays of an object field. The light is reflected from the light sensitive film surface after passing through the objective lens and the iris aperture of the lens barrel at the time of an exposure. A current generated by the light receptive element is integrated by an electronic flash lighting circuit in the camera or in a separately housed electronic flash device, and when the integrated voltage reaches a certain predetermined level, the electronic flash tube is extinguished by the electronic flash circuit.

In electronic flash photography, electronic flash devices of the automatic light adjusting type are well known, and which devices receive the reflected light from an object illuminated by an electronic flash for controlling the lighting time of the electronic flash generating device, such as an electronic flash tube. Nevertheless, in flash photography, the factors by which an exposure is determined include the iris aperture setting of the objective lens in the camera and the sensitivity of the film, as well as the brightness of an object which is illuminated by the flash device.

Therefore, in such automatic light adjusting means as described above, even if a light receptive element such as a photoconductor receives the reflected light from an object and controls the lighting time of the electronic flash device, if the light receptive element does not receive the light transmitted only through the objective lens and the iris aperture, the iris aperture setting will not affect the automatic light adjusting means. Therefore, the lighting of the electronic flash device for obtaining an appropriate exposure cannot be automatically controlled, and it becomes necessary to manually set the aperture information separately into the electronic flash control circuit.

OBJECTS OF THE INVENTION

It is a primary object of the present invention to provide apparatus of the type specified herein which automatically uses the iris aperture setting for controlling an electronic flash control circuit which determines the lighting time of the electronic flash device.

It is another object of the present invention to provide apparatus of the type specified herein capable of transmitting the iris aperture setting to a circuit for controlling the lighting time of an electronically generated flash so that the flash device exactly adjusts an exposure relative to a principal object in any object field.

It is still another object of the present invention to provide apparatus of the type specified herein for obtaining an appropriate exposure by automatically adjusting the lighting time of the electronic flash generating device.

SUMMARY OF THE INVENTION

The present invention relates to apparatus in which, for the purpose of attaining the objects described above, the exchangeable lens for the photographic camera is provided with light receptive elements for receiving, when the exchangeable lens barrel is mounted on the photographic camera body, the reflected imaging light rays of an object field. The light rays are reflected from the light sensitive film surface after projection through an objective lens and an iris aperture at the time of an exposure. The reflected light is used to generate a current which is integrated, and when the integrated voltage reaches a certain predetermined level, the lighting of the electronic flash device is extinguished by the control circuit.

BRIEF DESCRIPTION OF THE DRAWINGS

FIG. 6 is a graph diagram showing the output characteristics of a light receiving element as a function of the portion of a film surface from which the light rays are reflected where any one of the exchangeable lens barrels according to the embodiments of the invention is mounted on a camera;

FIG. 7 is a perspective view showing the outside appearance of an embodiment of an electronic flash device using an exchangeable lens barrel in accordance with the present invention;

FIGS. 8A and 8B are section views each of which depicts a part of a plug terminal for connecting an exchangeable lens barrel to a flash circuit, for example FIG. 7, and a changeover switch;

DESCRIPTION OF THE PREFERRED EMBODIMENT

Figure 1:
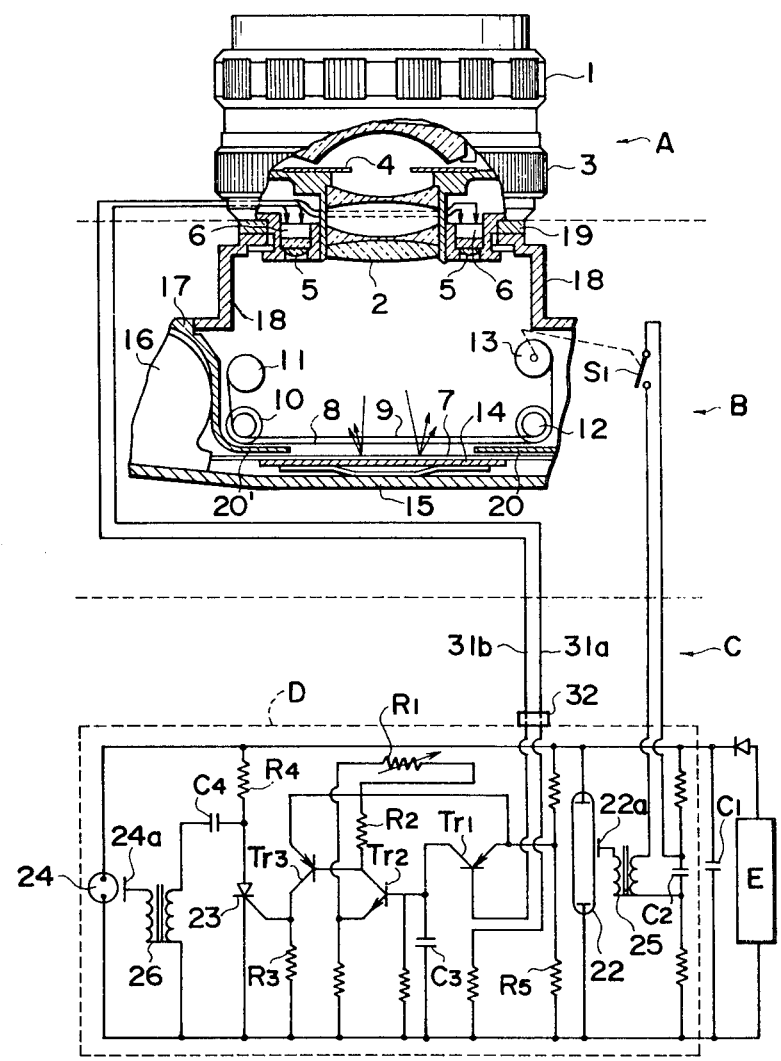
FIG. 1 shows a combined partially cut-away top view and circuit schematic illustrating the essential components of an embodiment of an exchangeable lens barrel and a wiring diagram of an electronic flash control circuit in accordance with the present invention.

Section A in FIG. 1 is an exchangeable lens barrel provided with light receptive elements, for example of the photoconductive type, which receive the light reflected from the film surface in a camera. Section B is the main body of a camera provided with an objective lens which is also exchangeable, and shown in section C is an example of an electronic flash circuit of an automatic light adjusting type which automatically controls the lighting time of the flash device by integrating a current generated by the light sensitive elements in section A. The exchangeable lens barrel carries out the distance adjustment as objective lens 2 is moved forwards or backwards by the turning of distance ring 1 through a well-known helicoid mechanism not shown in the drawing. The iris aperture adjustment, which advances and retreats a representative aperture blade 4 across objective lens 2, is set by the turning of aperture ring 3.

Reference numeral 6 denotes a pair of light sensitive elements which are mounted at the periphery of the back face of the exchangeable lens barrel and located at such positions so as not to interfere with light transmitted through the objective lenses and the iris aperture. Light receiving lenses 5, each of which is located at a position slightly nearer to the optical axis of the objective lenses than light sensitive elements 6, are mounted as shown. Also, the respective optical axis of each light receiving lens 5 and its associated light receptive element 6 are directed to the central portion of film 7 as will be more fully described below.

Section B includes camera body 17 provided on its back face with rear lid 15 and on its foreface with front plate 18. At the foremost end of front plate 18 is a lens mount 19 such as, for example, a bayonet mechanism which enables the exchangeable lens to be removably mounted to the camera body.

Between camera body 17 and rear lid 15 is film cartridge 16 which stores photosensitive film 7, and in front of the film conveying path within camera body 17, leading screen 8, of the focal plane shutter consisting of two screens, is wound between winding-up axle 13 and rewinding spring drum 10. Trailing screen 9 is wound between winding-up axle 12 and rewinding spring drum 11. FIG. 1 shows the situation at the time when the running of leading screen 8 has just finished and immediately prior to the closing of synchronous switch S1.

Further, respectively connected in parallel with voltage power source E are main capacitor C1; trigger capacitor C2 having resistors connected to each terminal thereof; electronic flash generator 22; semiconductor control element 23 connected thereto through resistor $R_4$; and a discharge device 24. Electronic flash generator 22 and discharge device 24 may each comprise the well-known tube type. Main capacitor C1 is charged by voltage power source E and ignites electronic flash generator 22. Trigger capacitor C2 is connected in series with synchronous switch S1, which is closed concurrently with the opening of the shutter in the main body of the camera. The primary winding of transformer 25 and a terminal of the secondary winding thereof is connected to trigger electrode 22a of electronic flash generator 22. Independently of the aforementioned parallel circuit, the base of transistor Tr1 is connected via resistor R5 and the light receiving elements 6 in the exchangeable lens A to one terminal of the voltage power source E. The light sensitive elements preferably each has a rapid response characteristic, such as is obtained with a selenium or a silicon photoconductor, or the like.

The collector of transistor Tr1 is connected to integrating capacitor C3 and to the base of transistor Tr2. The collector of transistor Tr2 is connected to the base of transistor Tr3, and the emitter of transistor Tr1 and the emitter of transistor Tr3 are interconnected. Interposed in series between the collector and emitter of transistor Tr2 are variable resistor R1 and fixed resistor R2, which are arranged in the electronic flash circuit D. The collector of transistor Tr3 is connected not only to fixed resistor R3 but also to the gate of semiconductor control element 23, which may be a silicon control rectifier or like component.

Connected in parallel with semiconductor control element 23, which is wired via resistor R4 to voltage power source E, is a series connection of capacitor C4 and the primary winding of transformer 26. Connected to one terminal of the secondary winding of transformer 26 is trigger electrode 24a of discharge device 24. Discharge device 24 should have an impedance less than that of electronic flash generator 22.

When leading screen 8 is opened and synchronous switch S1 is closed by the release operation, the charged voltage of trigger capacitor C2 is applied to trigger electrode 22a through transformer 25 so that electronic flash generator 22 is triggered. Thereby, the electronic flash generator is actuated while main capacitor C1 is discharged, and the light therefrom is reflected from an object. The light is affected by the distance to the object and/or by the surrounding embodiment. The reflected light is transmitted through objective lens 2 and iris aperture 4 in the exchangeable lens barrel A of the camera to expose film 7. The light is further reflected from film 7 to light receptive elements 6. Subsequently, the current generated therein in response to the light exposing film 7 is amplified by transistor Tr1, and integrating capacitor C3 is charged by the amplified current which flows between the emitter and the collector of transistor Tr1.

Since the incident light at this time on light receptive elements 6 is the light which has passed through iris aperture 4, the iris aperture setting in the exchangeable lens barrel A has affected the current charged by integrating capacitor C3. Therefore, if the film sensitivity is added by means of variable resistor R1 in the electronic flash circuit C, the trigger level of the electronic flash time control circuit will be adjusted in accordance with the film sensitivity also.

When the voltage of integrating capacitor C3 reaches the trigger level of transistor Tr2 determined by variable resistor R1 which is varied according to the film sensitivity and by the fixed resistor R2, transistor Tr2 becomes conductive. Concurrently, transistor Tr3 also becomes conductive so as to apply the trigger voltage to the gate of semiconductor control element 23 which in turn becomes conductive. Consequently, the discharge of capacitor C4 is started at the same time and the discharge current flows through the primary winding of transformer 26, so that the voltage induced in the secondary winding thereof is applied to trigger electrode 24a of discharge device 24. Accordingly, triggered discharge device 24 begins to discharge the residual charge of main capacitor C1. Since the impedance of discharge device 24 is less than the impedance of electronic flash generator 22, flash generator 22 is extinguished simultaneously with the beginning of the discharge of discharge device 24.

In the embodiment shown in FIG. 1, the electronic flash circuit C and the exchangeable lens barrel A are completely separable and distinct components, and the aforementioned description of the embodiment was primarily so that it could be more easily understood. However, it is of course possible that, for instance, any one of the components within chain line D included in electronic flash circuit C, namely, for example, electronic flash generator 22, may be rearranged in exchangeable lens barrel A.

Moreover, in lieu of controlling the extinguishing of electronic flash generator 22 by the aforesaid method, which involves the discharging of main capacitor C1 by the discharge device 24 having its impedance less than the impedance of the electronic flash generator 22, a switching means, for example, such as shown in U.S. Pat. No. 3,591,829 may be provided instead so as to make it possible to disconnect electronic flash generator 22 from main capacitor C1.

Figure 2:
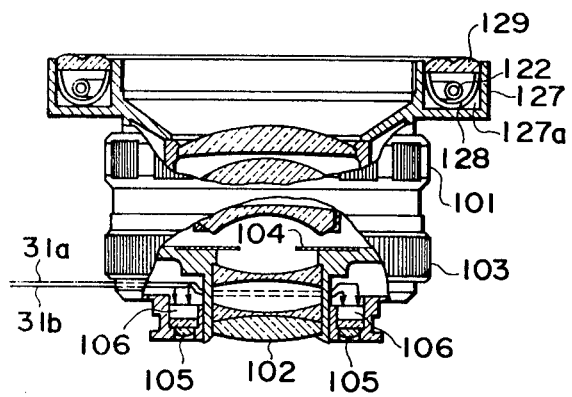
FIG. 2 is a partially cut-away top view showing a second embodiment of an exchangeable lens barrel.

With reference to FIG. 2 and the second embodiment of the lens barrel, channeled holding frame 127 is provided at the forward end of an exchangeable lens barrel so as to form a flange, and annular-shaped electronic flash generator 122 is mounted along the center circle within annular channel 127a of holding frame 127. Mounted along the back of frame 127 is annular-shaped mirror 128 with its section approximately in the form of a parabola. Mounted along the forward opening of annular channel 127a is ring-like lens 129 having a juxtaposed annular semicylindrical form. A pair of light receptive elements 106 and a pair of light receiving lenses 105 are respectively arranged at the rear side of the lens barrel, similar to the arrangement in the first embodiment. The reference numeral 102 denotes an objective lens, and 104 is an iris diaphragm.

Furthermore, it is of course possible, in the aforementioned construction, that comparatively smaller circuit components within the enclosure D are arranged within or directly associated with exchangeable lens barrel A, and comparatively larger circuit components such as main capacitor C1, voltage power source E, and the like, are arranged within the main body B of the camera.

In accordance with the construction of the first and second embodiments, the appropriate exposure control in many cases of electronic flash photography may be carried into effect. However, the use of the flash is not limited to the photographing of a principal object in the dark, but is sometimes adapted to, for instance, the photographing of a principal object in a bright counter-light. In such a case, according to the present invention, the output of the light receiving elements due to the counter-light in the background is additionally integrated, whereby the exposure time is too short with respect to the principal object.

However, such phenomenon as described above is not only restricted to flash photography in counter-light but also for flash photography in the dark. There is a special case where an object having a large reflecting power and a broad reflecting surface area is located in the foreground of the principal object and the object is also photographed together with the principal object. The light reflected on the film surface is incident upon the light receptive elements similarly as in the aforesaid case of the counter-light. This incident light impairs the appropriate exposure of the principal object so as to create a considerable error therein.

Therefore, in order to solve this problem, a study concerning the reflected light on the film surface was first carried out and indicated that there are two kinds of light rays in the reflected light. One is a component reflected on the film surface regularly which follows the reflecting principle, and the other kind is a separate component thereof that penetrates the photosensitive layer, and was irregularly reflected, in the interior of the photosensitive layer, by the particles of the photosensitive substance, the binding agent and the like composing the photosensitive layer. Such light rays are diffusively reflected on the film surface. It was also discovered that the regularly reflected component was by far the greater component in a specific direction.

Figure 3:
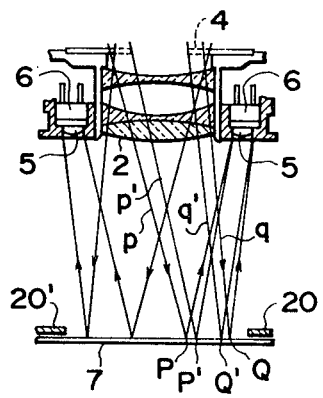
FIG. 3 is a view of an exchangeable lens barrel of the first embodiment mounted on a camera for illustrating the manner in which the light rays transmitted through the objective lens are reflected from the film surface to the light receptive elements.

Accordingly, the incoming condition of the regularly reflected light in the first and second embodiments described above was investigated. Referring to FIG. 3, reference numeral 4 denotes an iris aperture of which the full opened status is shown by the full lines, and a reduced opening to some given aperture value is shown by the broken lines. The light from an object passes through iris aperture 4 and is imaged on film 7 by objective lens 2, film 7 being disposed between exposure window frames 20 and 20'. Since it is necessary that a pair of light receptive elements 6 and a pair of their respective lenses 5 are mounted at positions where the imaging light of the objective lens 2 is not interfered with, they are arranged outside of the cylindrical boundary of objective lens 2 as shown in the drawing.

Accordingly, the directional view limits of the incident light on receptive elements 6 after being regularly reflected on film surface 7 are represented by the light rays shown by the two lines $p$ and $q$ where iris aperture 4 is fully opened. The light between lines $p$ and $q$ corresponds to the light rays composing the width of or boundaries of the picture image. Similarly in the case where iris aperture 4 is reduced to the status shown by the broken lines, the incident light on light receptive elements 6 after being reflected on the surface of film 7 is shown by lines $p'$ and $q'$, and this light corresponds to the reduced picture image boundary on the surface of film 7.

Consequently, if it is assumed that the object has a uniform brightness (including the case where it is illuminated by an electronic flash), the distribution of the reflected light incident upon light receptive elements 6 is as shown in FIG. 6. The output characteristics of each light receptive element 6 is shown as it corresponds to positions of the reflected light on film surface 7 for both the wide and narrow boundaries of the object field. Therefore, this indicates that, so long as there is no foreground object having a large reflecting power nor any bright portion attributable to counter-light within the range between P and Q (with the iris aperture fully opened) or between P' and Q', the electronic flash can be controlled so as to permit the exposure of a principal object. However, if any foreground object having a large reflecting power and included in this range is to be photographed, the electronic flash cannot be controlled so as to be able to provide an appropriate exposure of the principal object. This is indicated by the peaked curves shown in FIG. 6.

Figure 4:
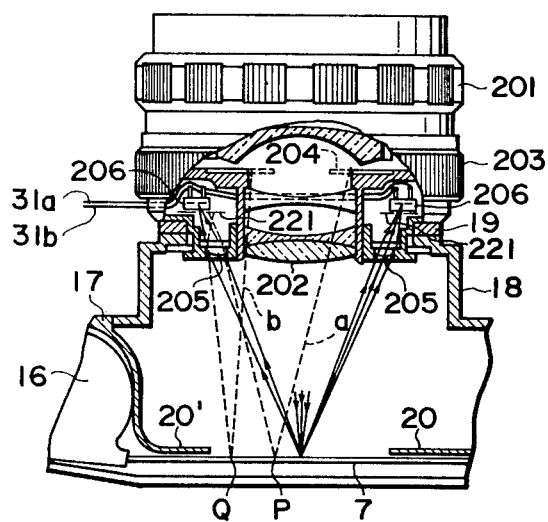
FIG. 4 is a partially cut-away top view showing the essential components of the third embodiment of an exchangeable lens barrel in accordance with the present invention.

The third embodiment of the present invention, shown in FIG. 4, provides structure to overcome the above disadvantages. Mounted in front of the light receiving face of light receptive elements 206 is light shielding plate 221 which is capable of shielding the light regularly reflected from the film surface between the two positions P and Q thereof. Thus, the peak characteristic between the two points P and Q in FIG. 6 can be eliminated so that the output directional characteristics of light receptive elements 6 with respect to the picture image on film surface 7 is modified as shown by the chain line. It is therefore possible to control the electronic flash so as to obtain an appropriate exposure of the principal object without regard to the condition of the object field for flash photography.

Figure 5:
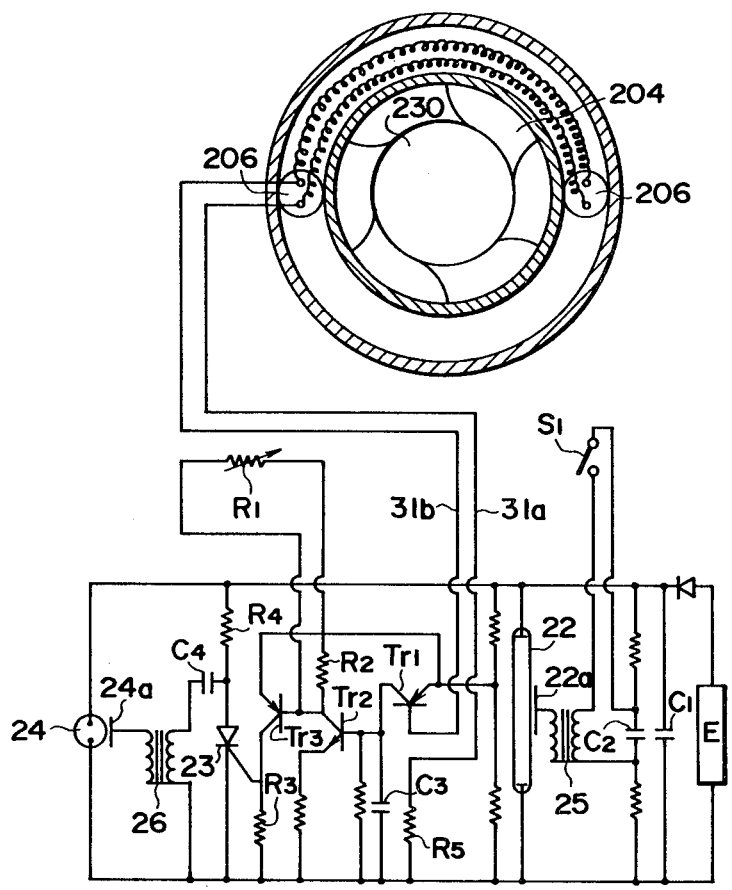
FIG. 5 shows a combined sectional front view of the exchangeable lens barrel of FIG. 4 and a wiring diagram of an electronic flash lighting control circuit.

Further reference to FIG. 4 shows a camera body and its associated lens barrel in partial section, and FIG. 5 shows in combination an electronic flash circuit, an output integrating circuit for the light receptive elements and a lighting control circuit for the third embodiment shown in FIG. 4.

Referring to FIGS. 4 and 5, the components therein equivalent to the first embodiment shown in FIG. 1 are iris aperture 204, objective lens 203, film 7 and exposure window frames 20 and 20'. The modified structure comprises a pair of light receptive elements 206 such as, for example, selenium cells, silicon photoconductors or the like having a speedy response characteristic and which are mounted not only symmetrically with respect to the optical axis of objective lens 202 but exterior to both sides thereof so that the imaging light of objective lens 202 is not interfered thereby. But the light receiving surfaces of the light receptive elements are still facing the film surface. Also, a pair of lenses 205 are mounted in front of light receptive elements 206 more proximate to the optical axis of objective lens 202 than are light receptive elements 206. A pair of light shielding plates 221 are interposed between light receptive elements 206 and lenses 205 so as to selectively shield the regularly reflected light from the film surface out of the imaging light in the case where the iris aperture is fully opened and especially to shield the regularly reflected light from the peripheal portion of the picture surface. In other words, the peripheral boundary light reflected from the objective field through the objective lens and the iris aperture and normally reflected from the light sensitive surface is shielded. In addition, the lighting control circuit for the electronic flash generator is, as shown in FIG. 5, completely similar to that of the first embodiment.

Figure 9:
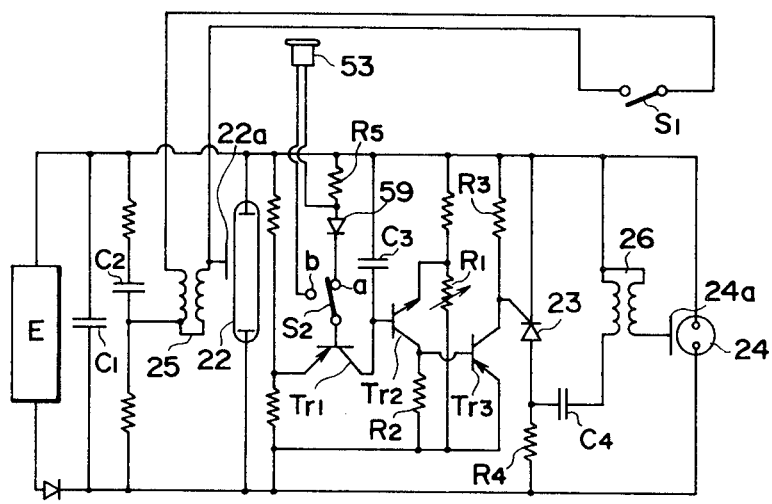
FIG. 9 is a wiring diagram of an electronic flash control circuit used with the connecting plug terminal and switch of FIGS. 8A and 8B.

There is shown in FIG. 7 through FIG. 9 an embodiment in which the electronic flash generator and the control circuit are enclosed in a case separate from the camera housing. The case of this embodiment further comprises another light receptive element for receiving light directly reflected from an object to be photographed, and a change-over switch, whereby the case can be used with or without light receptive elements 6, 106, 206 which are mounted in the exchangeable lens barrel. For example, the case may be used with a camera the lens barrel of which has no light receptive element, such that the electronic flash generator included in the case generates an electronic flash controlled relative to the light received from an object, which light is received by a light receptive element mounted in the case whereby the received light is not affected by the iris aperture setting. The case may also be used with a camera having an exchangeable lens barrel as illustrated in FIGS. 1 to 5, wherein a light receptive element 6, 106 or 206 in the respective exchangeable lens barrel is connectable to the control circuit within the case by means of a change-over switch constructed in a connection-terminal mounted on the case. Thus, the electronic flash generator in the case generates an electronic flash controlled relative to the light received by a light receptive element 6, 106, 206, which light consequently is affected by the iris aperture setting as mentioned above. A detailed explanation of this embodiment is described below.

The electronic flash device shown in FIG. 7 is provided on its front surface with an electronic flash generator 22 and with a light receiving window 52 which is to receive the light from an object. Light receptive element 59 is mounted behind light receiving window 52 (not shown in FIG. 7) and is connected in the flash control circuit as shown in FIG. 9. It is preferable that light receptive element 59 is selected to have rapid light responsive characteristics similar to light receptive elements 6, 106 and 206 described above.

The electronic flash device is further provided on its side surface with socket 53 to which is connected lead lines 31a and 31b which are wired to light receptive elements 6, 106 and 206 of the respective exchangeable lens assemblies.

With reference to FIG. 9, a lighting control circuit for an electronic flash generator will be described below. Contrary to the arrangements that are shown in FIGS. 1 and 5 in which light receptive elements 6 and 206 are individually respectively connected in series through resistor R5 with the base of transistor Tr1, change-over switch S2 is instead connected therewith in this embodiment. Also, connected in series with switch contact a of switch S2 are light receptive element 59 and resistor R5; and the other switch contact b is connected with a contact of socket 53 of which the other contact thereof is connected to the junction between light receptive element 59 and resistor R5. In addition, the aforesaid variable resistor R1 is rearranged and connected in this embodiment into the electronic flash circuit as shown in FIG. 9 and its resistance is set so as to correspond to the film sensitivity.

The structure of socket 53, switch S2, and plug 32 mating with socket 53 is shown in FIGS. 8A and 8B, wherein pin 32a of plug 32 is wired to one of two lead lines 31a and 31b which are both connected with light receptive element 6, 106 or 206 within the respective exchangeable lens barrel assemblies. The other of the two lead lines is wired to housing 32b of plug 32, housing 32b being electrically insulated through insulation liner 32c from pin 32a. Moreover, socket 53 is composed of a movable pin 55 which is made of an insulating material, a first terminal 56 on which pin 32a is retained and into which movable pin 55 is slidably received. Insulative body 57 surrounds first terminal 56, and second terminal 54, which is fixed on insulative body 57, is provided with an annular groove 58 into which housing 32b is to be slidably inserted and tightly retained therein.

The contacting end of movable pin 55 is engaged with the top surface of the movable resilient contact of change-over switch S2, which is biased so as to push up movable pin 55 as well as to come into contact with switch contact a. Only when it is pushed down against the biasing force is the resilient contact brought into engagement with switch contact b as shown in FIG. 8B.

Referring again to FIG. 9, as described above, the base of transistor Tr1 is connected to the movable contact of changeover switch S2, and switch contact a is connected with light receptive element 59. Further, by means of socket 53, first terminal 56 is to be connected to the junction between light receptive element 59 and resistor R5, and second terminal 54 is connected to switch contact b. Accordingly, when plug 32 is not fitted to socket 53, the movable contact of change-over switch S2 is kept in engagement with switch contact a by its normal bias as shown in FIG. 8A. Therefore, light receptive element 59 is interposed between the base of transistor Tr1 and resistor R5. Whereas, when plug 32 is inserted into socket 53 as shown in FIG. 8B, pin 32a depresses movable pin 55 against the biasing force of the movable contact of change-over switch S2 so as to force the contact into engagement with switch contact b. Thereby, light receptive element 6, 106 or 206 in the respective exchangeable lens barrel is interposed between the base transistor Tr1 and resistor R5 instead of light receptive element 59.

With plug 32 removed as in FIG. 8A, the lighting control circuit integrates a current of light receptive element 59 generated therein by receiving the light from an object, which light does not include information of the iris aperture setting, and controls the electronic flash generator. Whereas with plug 32 inserted in socket 53 as in FIG. 8B, the lighting control circuit controls the electronic flash generator by integrating a current generated by light receptive element 6, 106 or 206 which receives the light reflected from the light sensitive film surface, which light is reflected from an object and includes information of the iris aperture setting.

Figure 10:
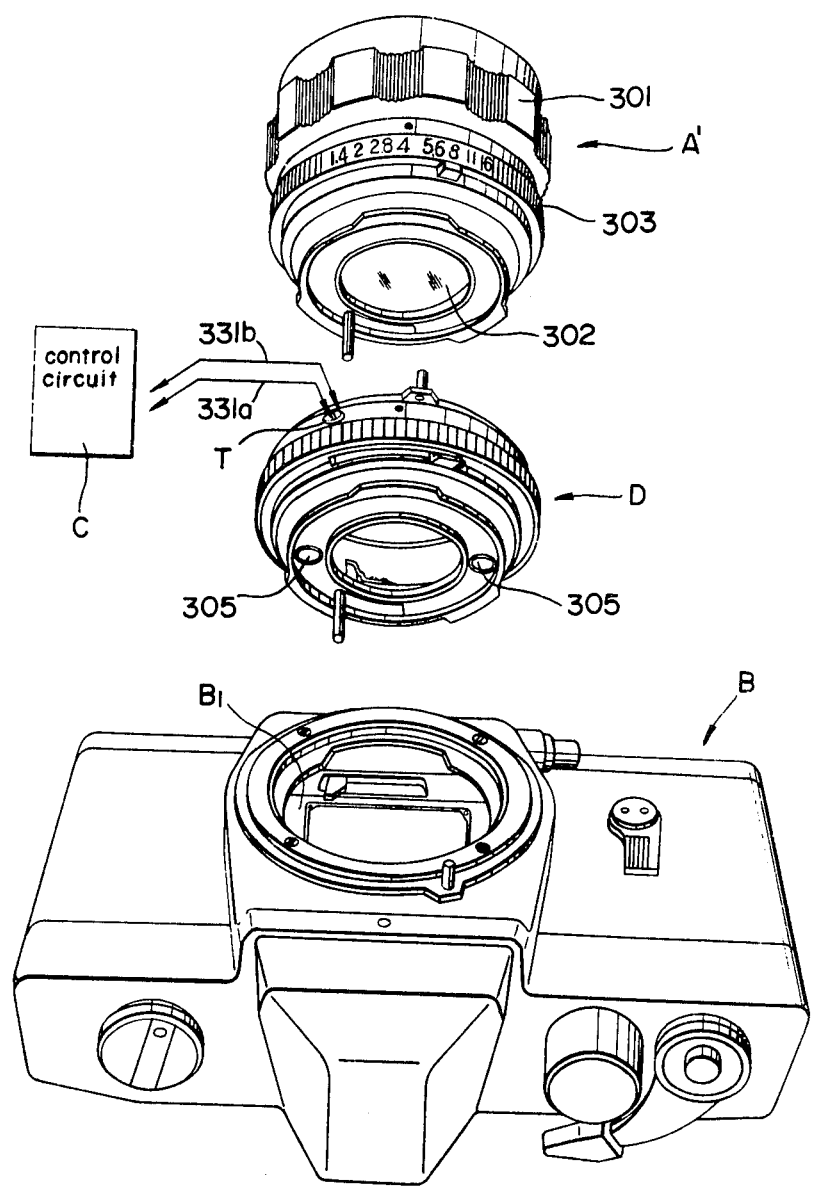
FIG. 10 is a perspective exploded view of the fourth embodiment in accordance with the present invention.

In FIG. 10, interchangeable object lens barrel A' is not provided with light receptive elements and receiving lenses as in the objective lens barrel shown in FIGS. 1, 2, 3, 4 and 5, but is provided with focusing ring 301, objective lens 302, and diaphragm 303 in the same way as in the conventional interchangeable objective lens barrel.

Figure 11:
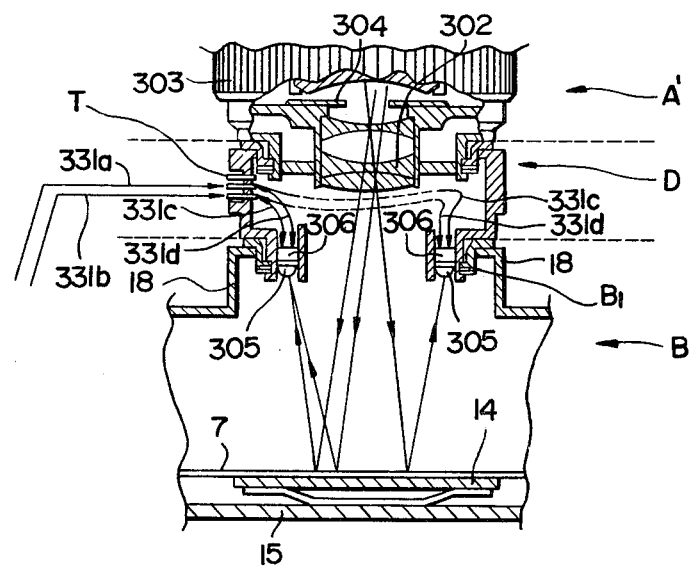
FIG. 11 is a longitudinal sectional side view of the components of the fourth embodiment shown in their operative connected relationship.

D denotes an extension tube which is interposed between lens barrel A' and receiving aperture B, in camera body B for focusing on an approaching object to effect close-up photography. With reference to FIG. 11, extension tube D is provided with light receiving lenses 305 disposed in a position facing a film in the camera body when extension tube D is attached to receiving aperture B, in the camera body as described above. Extension tube D further comprises light receptive elements 306 for receiving the light projected through light receiving lenses 305, which light is a portion of the light rays incident on and reflected by the film after passing through objective lens 302. Terminal T is mounted on the side of extension tube D as shown in FIG. 10. And light receptive elements 306 are connected to terminal T by lead lines 331c and 331d as shown in FIG. 11 and connected to any one of the above described electronic flash control circuits by lead lines 331a and 331b through terminal T.

Lead lines 331a, 331b, 331c, and 331d are positioned so that the path of light rays passing through objective lens 302 from an object, reflected from the film and incident on light receiving lens 305 is not shielded or blocked.

Figure 12:
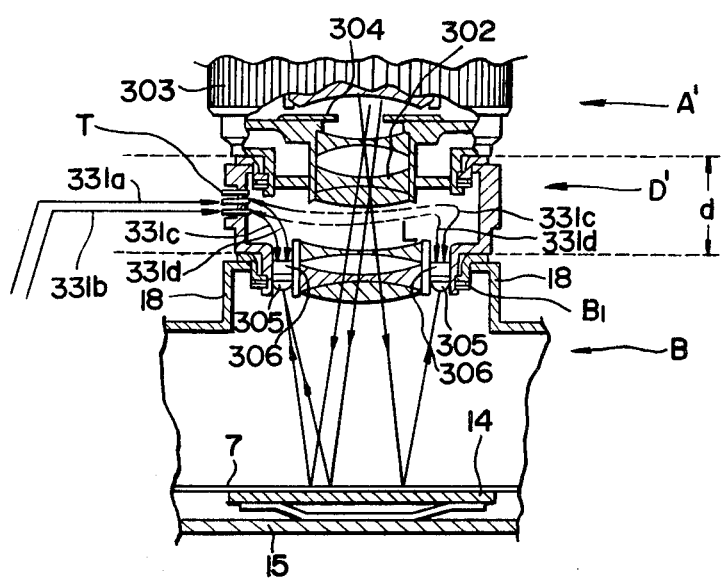
FIG. 12 is a longitudinal sectional side view of the fifth embodiment in accordance with the present invention.

The fifth embodiment of the object lens barrel shown in FIG. 12 is the same as the fourth embodiment shown in FIGS. 10 and 11, except that barrel D' is provided with compensating lens L, and is arranged in the same way as extension tube D. When barrel D' is attached to receiving aperture B1 of camera body B, receiving lenses 305 face the film. Barrel D' further comprises light receptive elements 306 for receiving the incident light reflected from the film and passing through receiving lenses 305 and compensating lens L, terminal T disposed on the side thereof, lead lines 331c, 331d for connecting light receptive elements 306 to terminal T, and lead lines 331a and 331b for connecting terminal T to any one of the previously described electronic flash control circuits.

Barrel D' is generally called a rear convertor and adapted to be used as a telephoto lens by mounting compensating lens L having a negative power, behind objective lens 302 to substantially lengthen the focal length.

As described above, extension tube D shown in FIGS. 10 and 11 and barrel D' shown in FIG. 12 demonstrate two specific modifications in accordance with the present invention that enable a camera to be adapted for various different photographic situations. For example, with respect to barrel D', by shortening length d (in the direction of the optical axis) as far as possible and making the negative power of compensating lens L as close to zero as possible in correspondence therewith, when an interchangeable objective lens barrel having no conventional light receptive elements 306 is mounted in camera body B by means of barrel D' it is possible to photograph the same as if the objective lens barrel is directly mounted to the camera body. However, it is additionally possible to control an electronic flash in accordance with the present invention as described above.

Therefore, it is apparent that barrel D' can be used with presently marketed conventional single lens reflex cameras and the interchangeable objective lens barrels used therewith, whereby light receptive elements 306 receive light reflected from the sensitive surface of a film so that duration of an electronic flash can be controlled.

From the foregoing description and accompanying drawings it will be apparent to those having skill in the art to which this invention is directed that the structures of the various embodiments may be interchanged and combined with one another to form different structural combinations other than those specifically set forth above. The following examples are exemplary of such modifications. The annular flash generator structure illustrated in FIG. 2 may be incorporated in the embodiments shown in FIGS. 1, 4 and 10-12. The shield members of the embodiment of FIG. 4 may be applied to the embodiments of FIGS. 1, 2 and 10-12. Also, the flash control circuitry represented in FIGS. 1, 5 and 9 may be interchangeably used with any of the objective lens or barrel member structures disclosed and described herein. Such modifications, as well as other variations not specifically described herein, will be apparent to those skilled in the art to which this invention is directed.

What is claimed is:

1. A barrel member adapted for exchangeable mounting to camera apparatus, comprising:
    light receptive means mounted on said barrel member whereby said light receptive means is adapted to receive light reflected from the light sensitive surface of a film when said barrel member is mounted to said camera apparatus;
    a terminal mounted on said barrel member; and
    means for electrically connecting said light receptive means to said terminal.

2. A barrel member as in claim 1 further comprising first means for mounting said barrel member to an aperture in the camera apparatus, said light receptive means are mounted at said first means for mounting.

3. A barrel member as in claim 2 wherein said light receptive means comprises at least one pair of first and second light receptive elements mounted in symmetrical spaced relationship around the periphery of said first means for mounting.

4. A barrel member as in claim 3 further comprising at least one pair of first and second receiving lenses mounted in respective operative association with said respective first and second light receptive elements.

5. A barrel member as in claim 4 wherein said barrel member is an extension tube further comprising second means for mounting an objective lens barrel thereto.

6. A barrel member as in claim 4 further comprising a compensatory lens mounted between said at least one pair of first and second light receptive elements.

7. A barrel member as in claim 4 further comprising an objective lens and an iris diaphragm mounted within the barrel member with said objective lens mounted between said first and second light receptive elements.

8. A barrel member as in claim 7 further comprising flash generator means mounted at the end of the barrel member opposite to said first means for mounting.

9. A barrel member as in claim 8 wherein said flash generator means comprises an annular shaped reflector channel, an annular shaped flash generator element mounted within said annular shaped channel and an annular shaped lens covering said flash generator element.

10. A barrel member as in claim 8 wherein said first and second receiving lenses are mounted in closer proximity to the optical axis of said objective lens than said first and second light receptive elements.

11. A barrel member as in claim 10 further comprising at least one pair of first and second apertured shield members respectively mounted between said first and second receiving lenses and said first and second light receptive elements.

12. A barrel member and exchangeable objective lens assembly for a camera; comprising:
a barrel member adapted for exchangeable mounting to said camera;
light receptive means mounted on said barrel member whereby said light receptive means are adapted to receive light reflected from the light sensitive surface of a film with said barrel member mounted to said camera;
a terminal mounted on said barrel member;
means for electrically connecting said light receptive means to said terminal; and
an exchangeable objective lens including an iris diaphragm mounted to said barrel member.

13. A barrel member and exchangeable objective lens assembly for a camera as in claim 12 wherein said barrel member further includes a compensatory lens mounted therein.

14. A barrel member and mounting assembly for a camera, comprising:
a barrel member adapted for exchangeable mounting to said camera apparatus;
light sensitive means mounted on said barrel member;
a terminal mounted on said barrel member;
means for electrically connecting said light receptive means to said terminal; and
means for mounting said barrel member to said camera and including an aperture, said camera is adapted to receive a film, whereby said light receptive means are adapted to receive light reflected from the light sensitive surface of said film with an objective lens barrel mounted to said barrel member.

15. A barrel member and mounting assembly as in claim 14 wherein said barrel member further includes a compensatory lens mounted therein.

16. A barrel member and mounting assembly as in claim 14 further comprising an objective lens and an iris diaphragm mounted to said barrel member.

17. A barrel member and mounting assembly for a camera, comprising:
a barrel member adapted for exchangeable mounting to said camera apparatus;
light receptive means mounted on said barrel member whereby said light receptive means is adapted to receive light reflected from the light sensitive surface of a film with said barrel member mounted to said camera apparatus;
a terminal mounted on said barrel member;
means for electrically connecting said light receptive means to said terminal; and
means including an aperture for mounting said barrel member thereto, said camera is adapted to receive a film whereby said light receptive means are adapted to receive light reflected from the light sensitive surface of said film with said barrel member mounted to said camera.

18. A barrel member and mounting assembly as in claim 17 wherein said barrel member further comprises an annular shaped reflector channel, an annular shaped flash generator element mounted within said annular shaped channel, and an annular shaped lens covering said flash generator element.

19. Camera apparatus as in claim 17 wherein said light sensitive means includes at least one pair of first and second light receptive elements mounted in symmetrical spaced relationship around the camera optical axis, said barrel member further comprises at least one pair of first and second receiving lenses mounted in respective operative association with said respective first and second light receptive elements, and said first and second receiving lenses are mounted in closer proximity to the optical axis of said objective lens than said first and second light receptive elements.

20. A camera, comprising:
means for receiving a first barrel member and including an aperture;
a film having a light sensitive surface and mounted within said camera so that said light sensitive surface faces said aperture;
means for generating a flash;
means for controlling the duration of said flash;
said first barrel member comprising means engaging said means for receiving to mount said first barrel member thereto;
light receptive means mounted at the periphery of said means for engaging;
said camera further comprising a second barrel member including an objective lens and an iris diaphragm and mounted to said first barrel member whereby said light receptive means receive light rays projected through said iris diaphragm and said objective lens and reflected from said light sensitive film surface; and
said means for controlling the duration of said flash is responsive to said light receptive means.

21. A camera as in claim 20 wherein said first barrel member further includes a compensatory lens mounted therein between said light sensitive film surface and said means for engaging to compensate light rays projected through said iris aperture and said objective lens.

22. Apparatus for controlling an electronic flash for a camera, comprising:

a lens barrel exchangeably mounted to the camera body and having an objective lens and an iris diaphragm;

a light receptive element mounted on said lens barrel at the periphery of said objective lens facing the light sensitive film surface with said lens barrel mounted on said camera body whereby said light receptive element receives the light transmitted through said objective lens and the iris aperture and reflected from said light sensitive surface;

a shielding member including an opening therein and mounted at the periphery of said objective lens in front of the light receiving surface of said light receptive element for shielding only such light rays that represent the peripheral boundary light reflected from the objective field through said objective lens and said iris aperture and normally reflected from said light sensitive surface;

a power source;

means for generating an electronic flash connected in series with said power source;

a main capacitor connected with said power source across said means for generating an electronic flash for exciting said means for generating;

a trigger circuit including a trigger capacitor and a synchronous shutter switch connected in series with said trigger capacitor;

an integrating circuit including an integrating capacitor for integrating the current generated by said light receptive element in accordance with the light received thereon;

an electric timing means for controlling the excitation of said means for generating an electronic flash by extinguishing it when the integrated voltage of said integrating capacitor reaches a predetermined voltage; and a receiving lens mounted at the periphery of said objective lens in front of the light receiving surface of said light receptive element and at a position proximate to the optical axis of said objective lens and nearer thereto than said light receptive element for collectively directing a selected portion of the light reflected on the central portion of said light sensitive film surface towards said light receptive element.

23. Apparatus for controlling an electronic flash as in claim 22, wherein said light receptive element includes a number of light receptive members and said shielding member includes a number of shielding elements mounted on said exchangeble lens barrel at the periphery of said objective lens and said iris aperture thereof symmetrically with respect to the optical axis thereof.

* * * * *